(12) United States Patent
Jallow et al.

(10) Patent No.: US 9,094,454 B2
(45) Date of Patent: Jul. 28, 2015

(54) LOCATION SPECIFIC PERSONALIZED ENTERPRISE SERVICES USING VIDEO SIGNATURE OF AN ELECTRONIC DISPLAY

(75) Inventors: Schayne Jallow, San Jose, CA (US); Llavanya Fernando, San Jose, CA (US); Manjula Dissanayake, Pelawatte (LK); Ushan Karunathilaka, Karadeniya (LK); Asanka Alwis, Mt. Lavinia (LK)

(73) Assignee: Zone24x7 Inc., San Jose, CA (US)

( * ) Notice: Subject to any disclaimer, the term of this patent is extended or adjusted under 35 U.S.C. 154(b) by 0 days.

(21) Appl. No.: 13/313,299

(22) Filed: Dec. 7, 2011

(65) Prior Publication Data

US 2012/0314090 A1    Dec. 13, 2012

Related U.S. Application Data

(60) Provisional application No. 61/520,427, filed on Jun. 10, 2011.

(51) Int. Cl.
| | |
|---|---|
| *H04K 1/00* | (2006.01) |
| *H04L 29/06* | (2006.01) |
| *H04W 4/00* | (2009.01) |
| *G06K 7/10* | (2006.01) |

(52) U.S. Cl.
CPC .............. *H04L 63/18* (2013.01); *G06K 7/1095* (2013.01); *H04W 4/008* (2013.01)

(58) Field of Classification Search
CPC ...... H04L 63/18; H04W 4/008; H04W 4/025; G06K 7/1097; G06K 19/06037
USPC ........ 380/258; 348/207.1, 571, 619, E05.024
See application file for complete search history.

(56) References Cited

U.S. PATENT DOCUMENTS

| | | | | |
|---|---|---|---|---|
| 7,024,394 | B1 * | 4/2006 | Ashour et al. ................... | 705/64 |
| 2002/0178072 | A1 * | 11/2002 | Gusler et al. ..................... | 705/26 |
| 2006/0074769 | A1 * | 4/2006 | Looney et al. ................... | 705/26 |
| 2007/0150362 | A1 * | 6/2007 | Sharma et al. ................... | 705/26 |
| 2012/0230577 | A1 * | 9/2012 | Calman et al. ................... | 382/138 |
| 2013/0073374 | A1 * | 3/2013 | Heath ........................ | 705/14.39 |
| 2013/0231990 | A1 * | 9/2013 | Munjal et al. .............. | 705/14.23 |
| 2014/0180864 | A1 * | 6/2014 | Orlov et al. ................... | 705/26.7 |
| 2014/0324627 | A1 * | 10/2014 | Haver et al. ................... | 705/26.9 |

FOREIGN PATENT DOCUMENTS

| | | | |
|---|---|---|---|
| EP | 2166697 A1 * | 3/2010 | |
| WO | WO 2009101549 A2 * | 8/2009 | |
| WO | WO 2009127984 A1 * | 10/2009 | |

* cited by examiner

*Primary Examiner* — Samson Lemma
(74) *Attorney, Agent, or Firm* — Useful Arts IP (57) ABSTRACT

Readily available mobile computing devices and electronic display signs that are associated with particular locations are used to provide enhanced location specific services to customers in a secure manner. A customer at enterprise premises can access the available services published by the enterprise by capturing information from an electronic display sign using an authentic mobile computing device application. Non-reproducible content is displayed on the electronic display signs to enable authentication of a mobile computing device application, where the mobile computing device application once authenticated acts as a trusted end point to publish the enterprise services. Hardware investment for the enterprise is reduced, and shortcomings of existing network based location specific services are overcome.

14 Claims, 11 Drawing Sheets

Camera view of the mobile
application without View Port Masking

FIG. 5c

View port masking of the image based on the View port seed
vector provided by the backend

LOCATION SPECIFIC PERSONALIZED ENTERPRISE SERVICES USING VIDEO SIGNATURE OF AN ELECTRONIC DISPLAY

RELATED APPLICATION

This application claims benefit of provisional U.S. Patent Application No. 61/520,427 of the present inventors filed Jun. 10, 2011, titled, SYSTEM TO PROVIDE LOCATION SPECIFIC PERSONALIZED ENTERPRISE SERVICES USING LOCATION IDENTIFICATION BASED ON A VIDEO SIGNATURE OF AN ELECTRONIC DISPLAY VALIDATED THROUGH A MOBILE COMPUTING DEVICE APPLICATION, incorporated herein by reference.

BACKGROUND

Present day enterprises use hardware, such as kiosks, handheld devices, etc., and applications integrated to this hardware to provide location specific services to their customers. Purchase and maintenance of the hardware is expensive. Typically, the services are not personalized to the customer.

BRIEF DESCRIPTION OF THE DRAWING FIGURES

The present invention may be understood from the following description in conjunction with the appended drawing figures. In the drawing.

DETAILED DESCRIPTION

Summary

Mobile computing devices (mobile electronic devices) such as smart phones, PDAs, etc. are becoming popular, and a majority of these includes a camera, internet connectivity and the ability to download external applications. As described herein, a mobile computing device application is used as a trusted end point of the enterprise to provide location based services. One application can be to display the "in store" price details of merchandise on a customer smart phone.

In one embodiment, a readily available mobile computing device is used to provide location specific services to the customer in a secure manner using electronic display signs associated to a given physical location. The electronic display signs display a one-time video signature that guarantees the physical presence of the customer to ensure that location specific services are not provided if the customer is not physically present. The readily available network based services (for example but not limited to GPS, GSM Cell, location based services using WiFi/WiMAX location services) do not provide the level of accuracy that is expected by enterprises.

For example, a customer at a retail store using an authentic mobile computing device application can take a picture or video of the electronic display sign, which displays information including location information and retailer information. The mobile computing device application generates a unique signature token, which is used to communicate with the services of the retailer in a secure way. The process ensures that the customer is present in front of the electronic display sign while accessing the available services offered by the retailer. Thereafter, personalized services offered by the retailer such as store location specific pricing may be displayed on the mobile computing device of the customer.

Figure 3:
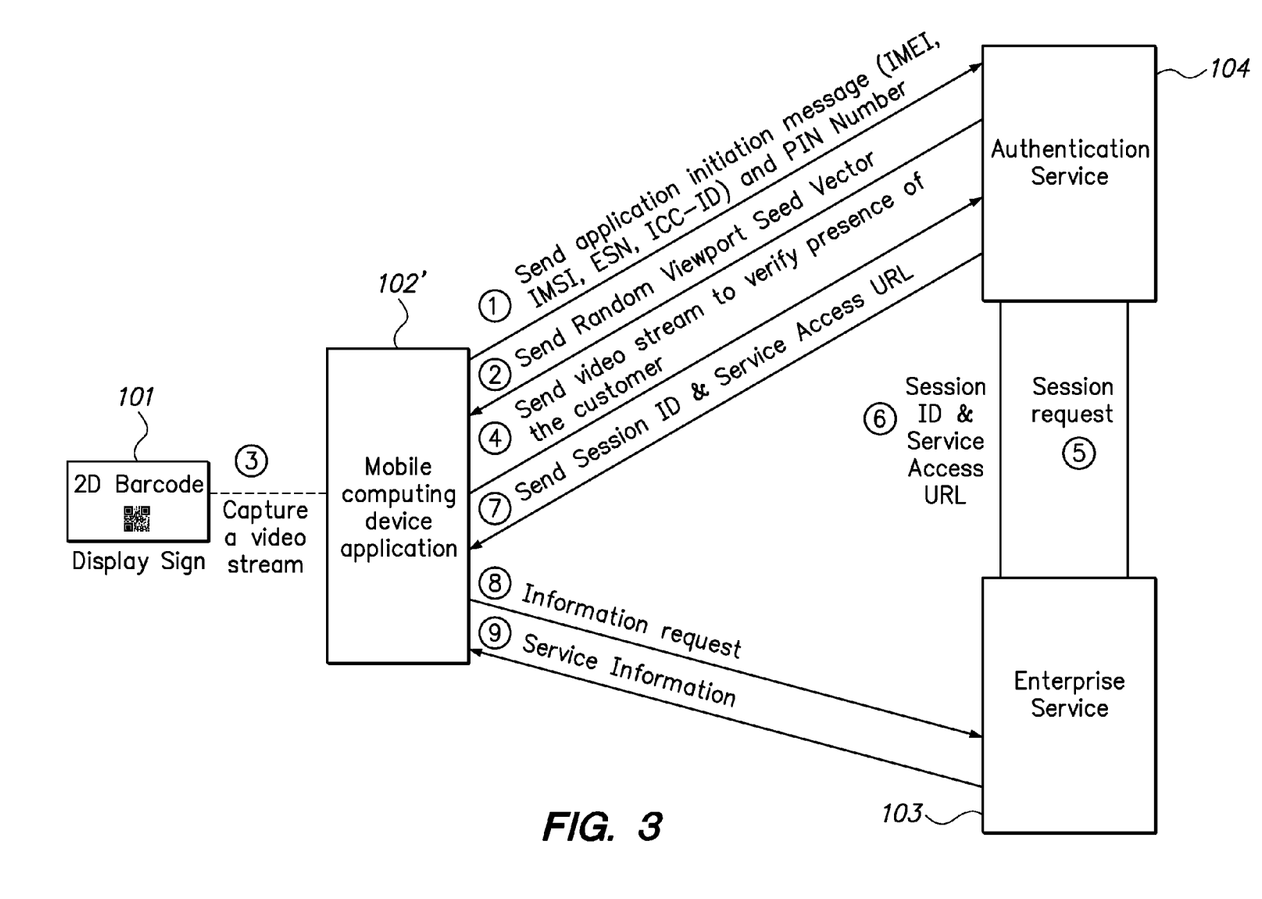
FIG. 3 is a diagram illustrating a messaging sequence that takes place when accessing enterprise services via the downloaded customer specific mobile computing device application.

The present system provides a secure way to identify location information and provides a secure mean to access enterprise services (FIG. 3, 103) using a mobile computing device application (FIG. 3, 102). The mobile computing device application can be downloaded, for example, via the internet after registering with an enrollment service (FIG. 1, 105) published via the internet.

Customer Enrollment Process

Figure 1:
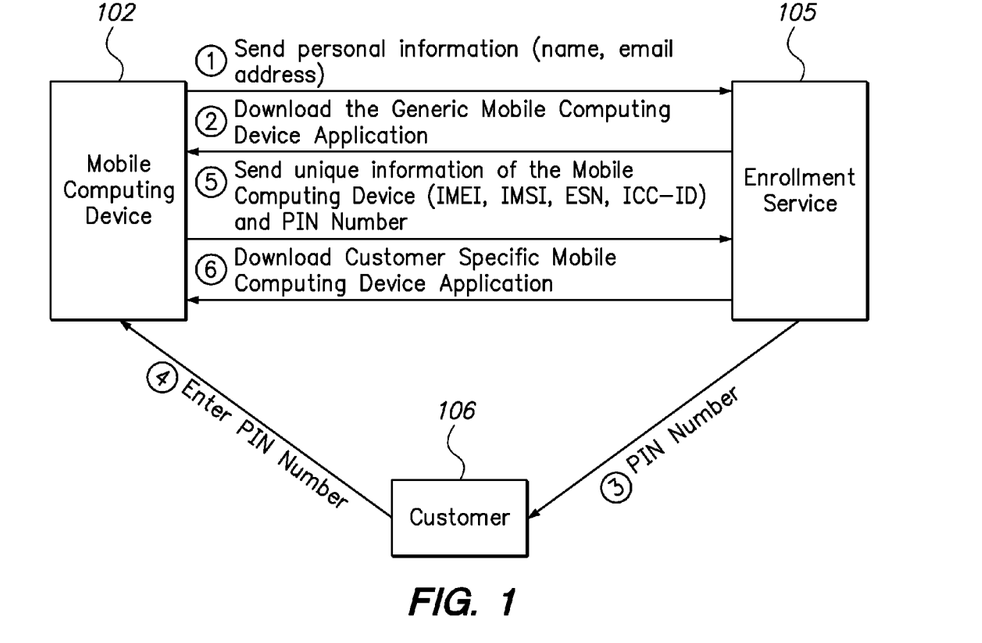
FIG. 1 is a diagram illustrating the operational aspects of downloading a customer specific mobile computing device application.

As illustrated in FIG. 1, the customer can connect to the enrollment service 105 via the customer's mobile computing device 102, provide personal information such as, for example, name, email address etc. (Step 1), and download a generic mobile computing device application to the mobile computing device 102 (Step 2). The enrollment server 105 sends a notification by way of email or SMS to the registered customer 106 indicating a PIN number (Step 3). Then the customer 106 enters the PIN number into the generic mobile computing device application to retrieve unique information pertaining to the mobile computing device 102 (Step 4). These details, which may include, for example, IMEI, IMSI, (International Mobile Subscriber Identity), ESN (Equipment Serial Number), ICC-ID (Integrated Circuit Card Identifier), are sent to the enrollment server to dynamically generate a customer specific mobile computing device application (Step 5). This customer specific mobile computing device application, along with an encryption key (e.g., a DUKPT Root Key) for the given customer is downloaded to the target mobile computing device 102 (Step 6). This customer specific mobile computing device application will not function on any other device.

Figure 6:
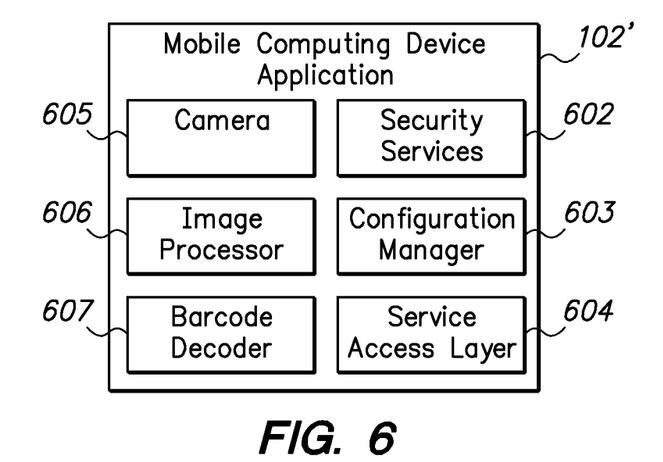
FIG. 6 is a diagram illustrating main components of the mobile computing device application used by the present system.

Main components of the mobile computing device application 102' are illustrated in FIG. 6. In one embodiment, they include security services 602, a configuration manager 603, a server access layer 604, a camera 605, an image processor 606 and a barcode decoder 607.

Application Usage Flow

Figure 2:
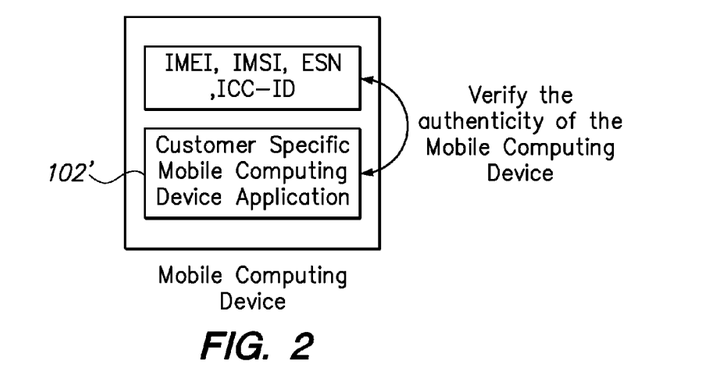
FIG. 2 is a diagram illustrating a customer specific mobile computing device application initiation process.

As illustrated in FIG. 2, the customer specific mobile computing device application 102' running on the mobile computing device 102 performs a self verification test (referencing, for example, one or more of IMEI, IMSI, ESN, ICC-ID, etc.) to ensure that the application is running on an authentic device.

As illustrated in FIG. 3, when the customer needs to access enterprise services 103, the customer starts the mobile computing device application 102' and enters the PIN number (after successful self verification test). During an initiation process, the mobile computing device application 102' sends device information (e.g., IMEI, IMSI, ESN, ICC-ID) and the PIN number to an authentication service 104 to generate a random viewport seed vector (RVSV) for the mobile computing device application 102' (Step 1). The generated RVSV is sent to the mobile computing device application 102'.

In order to induce a movement on the mobile computing device, the RVSV is used to mask a selected area of the mobile computing device display in a predetermined manner. For example, 10% of the South East section of the image can be masked on the viewport. FIG. 5C illustrates the camera view of the mobile application without viewport masking. FIGS. 5D-5F illustrate an example of view port masking and the generated movement pattern of the device. For example, when the user cannot see the South East section of the image (2D barcode) on the mobile computing device display, the user will be forced to move the phone towards South East direction to capture the entire image through the viewport as displayed on the screen. The direction of the movement (which area will be masked on the viewport) may be predetermined by the system backend.

Figure 8:
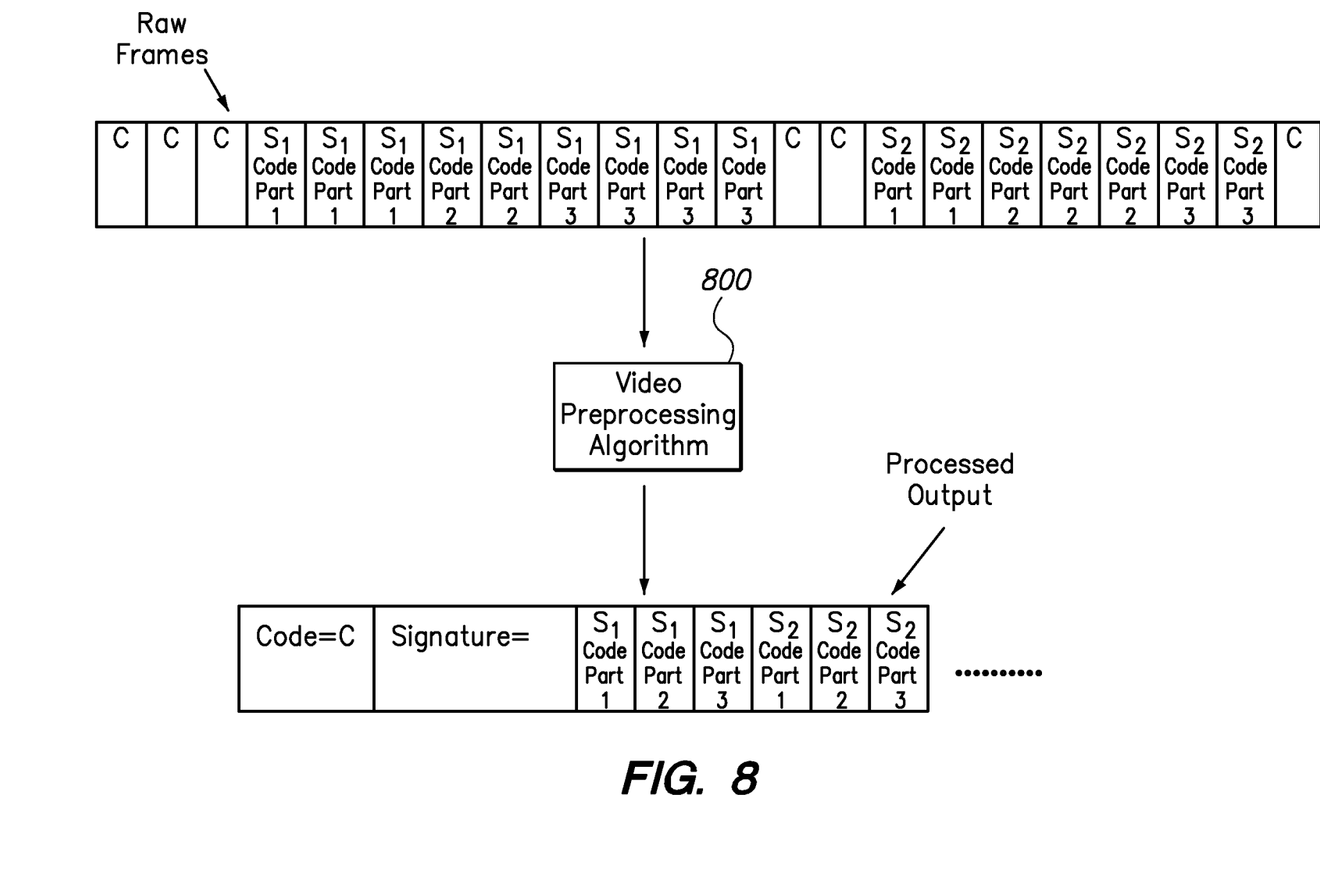
FIG. 8 is a diagram illustrating generation of processed output from raw frames captured by the mobile computing device application.
Figure 8A:
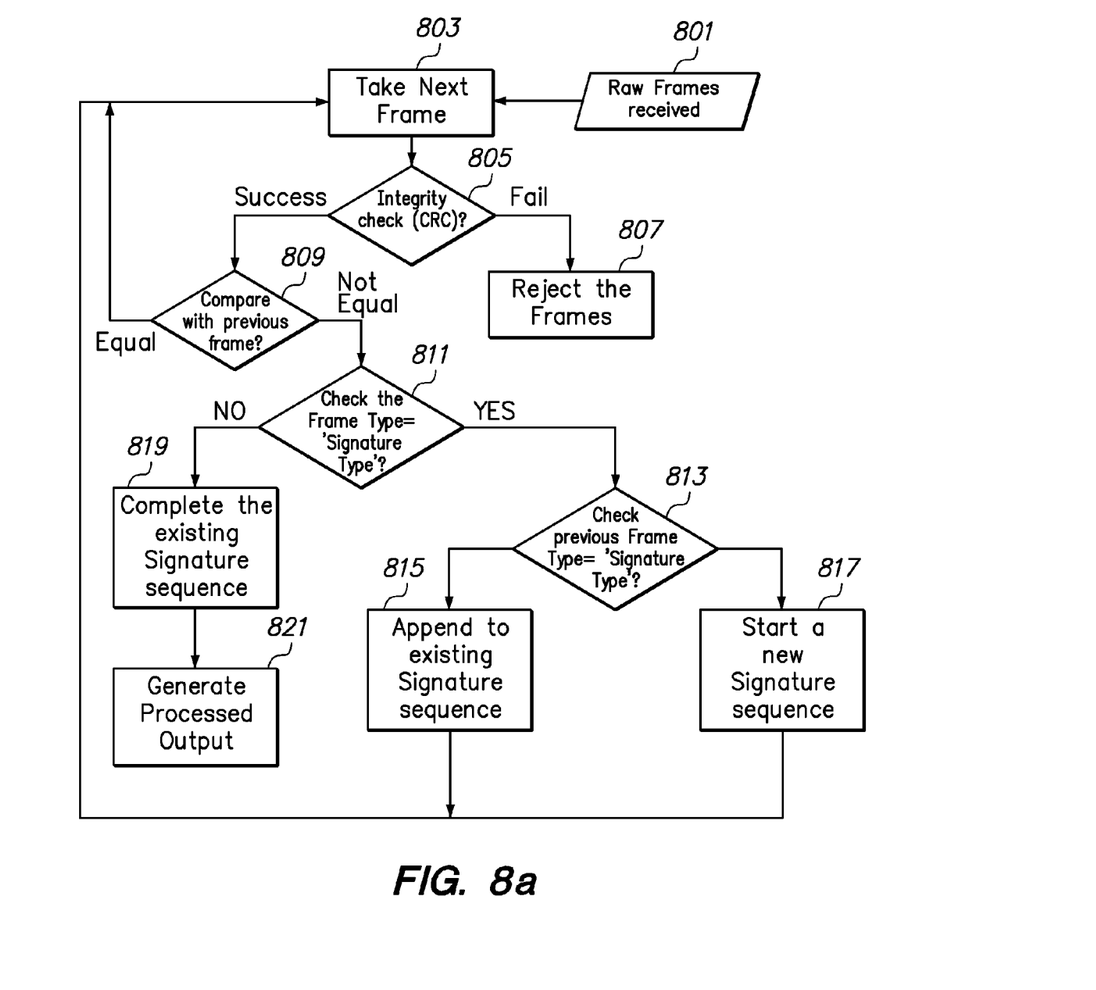
FIG. 8A is a diagram illustrating a video processing algorithm used in FIG. 8.

Referring again to FIG. 3, the mobile computing device application 102' captures a small video stream of video including an electronic display sign 101, and also captures information retrieved from a motion sensor residing in the mobile computing device 102 (Step 3). Information may be displayed on the electronic display sign 101 in encoded form, for example in the form of a graphic pattern such as a 2D barcode, QR code, or the like. The captured video stream data will be preprocessed as illustrated in FIG. 8 and FIG. 8A. Then the processed data and motion sensor information, along with a device ID (for example, IMEI number) and user ID (for example, PIN) is encrypted using any cryptographic key distribution method (such as DUKPT) and sent to the authentication service (Step 4).

The electronic display sign 101 may be of any of various types including, for example, LCD, CRT, OLED, electrophoretic, cholesteric LCD, electrochromic, etc. In one embodiment, the electronic display sign 101 is a bistable display. In one embodiment, the electronic display sign is network connected, in either wired or wireless fashion.

Figure 4:
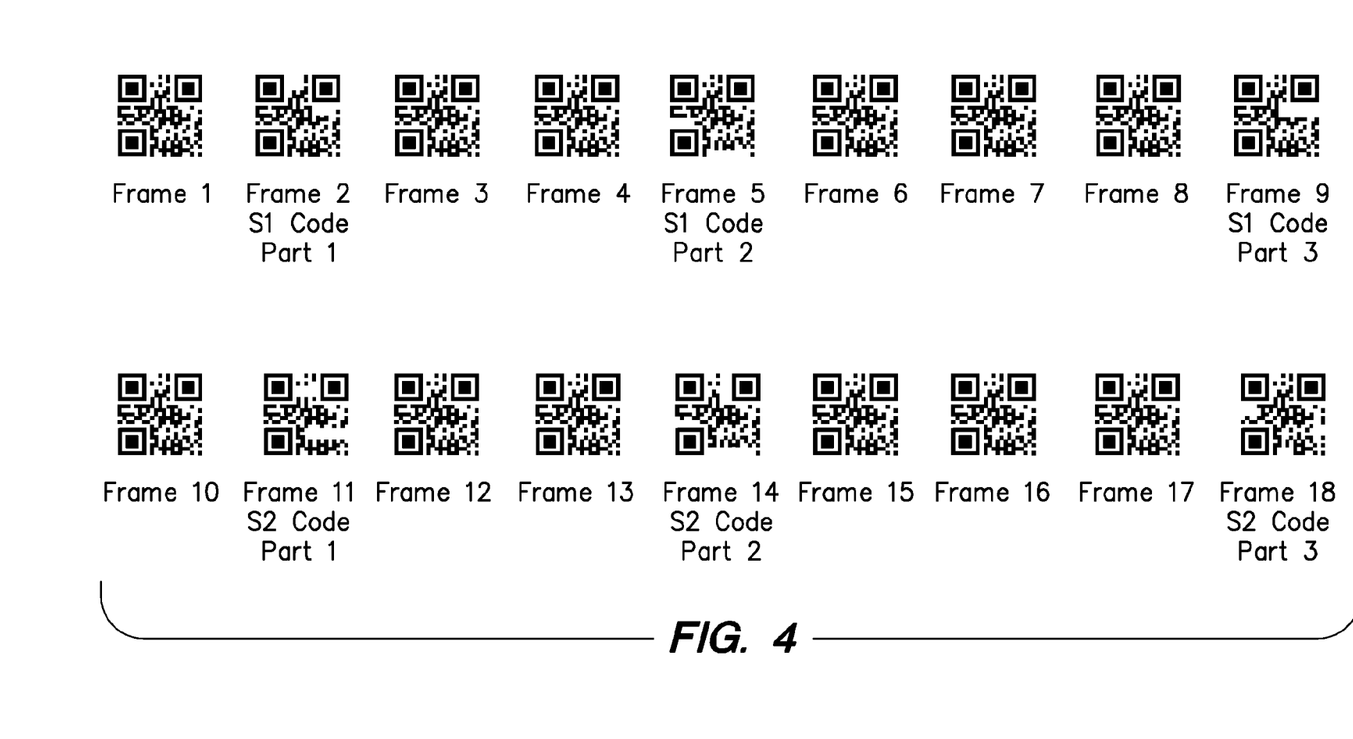
FIG. 4 is a diagram illustrating a frame pattern displayed on the electronic display sign interchangeably with a 2D item code.
Figure 7:
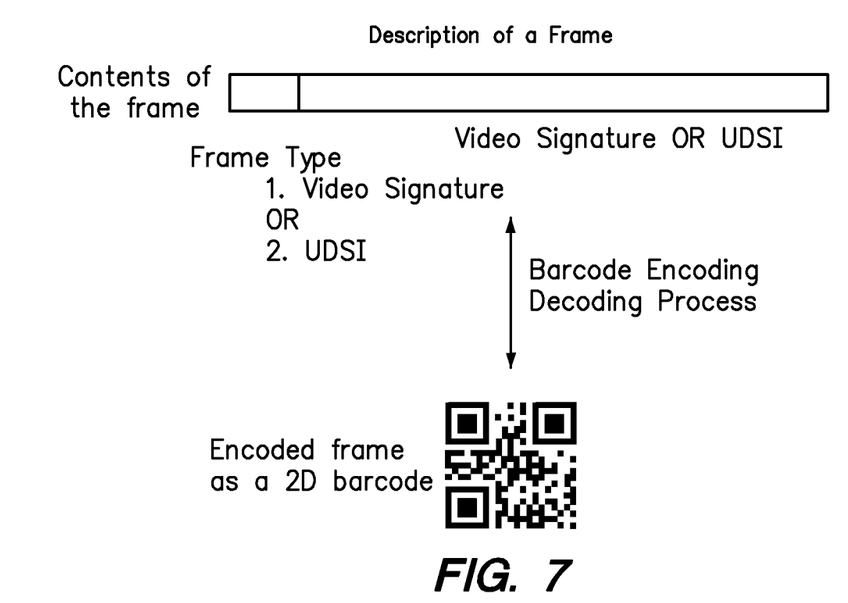
FIG. 7 is a diagram illustrating the contents of a 2D barcode displayed in a single frame.

The authentication service 104 validates the message by decrypting the content using the selected cryptographic key distribution method. A valid video stream, or video sequence, consists of Unique Display Sign Identifier (UDSI) image frames and video signature related image frames encoded in a 2D barcode format as shown in FIG. 4. FIG. 7 illustrates the contents of a 2D barcode displayed in a single frame. A frame type prefix identifies the frame as a video signature frame or a UDSI frame. The frame body contains the video signature information or the USDI. A barcode encoding process is used to encode the frame as a 2D barcode. Similarly, a barcode decoding process may be used to decode the 2D barcode and obtain the original frame information.

More particularly, the 2D barcode may be decoded using readily available 2D barcode decoding algorithms at the authentication service 104. Using the algorithms such as those described hereinafter, the one-time video signature of the given electronic display sign may be verified.

Referring to FIG. 8, the stream of raw video frames captured by the mobile computing device 102 will include repetitions of various ones of the frames shown in FIG. 4. In FIG. 8, the encoded UDSI is represented by the letter C. A video processing algorithm 800 is used to remove redundant frames. The resulting processed output contains the code C (USDI), followed by the video signature, consisting in one embodiment of the following six parts: $S_1$/Part 1, $S_1$/Part 2, $S_1$/Part 3, $S_2$/Part 1, $S_2$/Part 2, and $S_2$/Part 3.

Further details of the video preprocessing algorithm 800 are shown in FIG. 8A. Raw video frames are received and buffered (801). The next frame in order is retrieved (803), and an integrity cheek (e.g., CRC check) is performed (805). If the check is unsuccessful, the frame is discarded (807). Otherwise, the frame is compared to the last frame (i.e., the immediately preceding frame) (809). If the frames are equal, then the current frame is redundant. No action is taken, and processing proceeds to the next frame (803).

If the frames are unequal, then a check is made to see whether the frame type is that of a signature frame (811). If so, then a check is made to see whether the preceding frame type was also that of a signature frame (813). If so, then the current frame is appended to the existing signature sequence (815). If not, then a new signature sequence is started (817).

If the frame type is not that of a signature frame (811), then the existing signature sequence is completed (819), and the processed output is generated (821).

Referring once again to FIG. 3, when verification of the signature sequence is successful, enterprise details for the given UDSI are looked up, and the UDSI, device ID and user ID are sent to enterprise services 103 in the form of a session request (Step 5). Enterprise services 103 generates a session ID based on the received information using readily available session ID generating algorithms. This session ID, a service access URL, and an enterprise public key are then sent back to the authentication service 104 (Step 6). The authentication service 104 encrypts the session ID, service access URL and enterprise public key using a DKPUT key and sends to the mobile computing device application 102' (Step 7).

The decrypted session ID and the enterprise public key can be used by the mobile computing device application 102' to communicate with enterprise services 103. In order to communicate with enterprise services 104, the mobile computing device application 102' uses the enterprise services URL and information stored in and displayed by the electronic display sign in encoded form, which includes UDSI.

More particularly, the mobile computing device application 102' communicates with enterprise services 103 using the decoded UDSI, which is encrypted using the public key of the enterprise as part of an information request (Step 8). Enterprise services 103 decrypts the received information using the private key of the enterprise, looks for information related to the UDSI, and sends back the resulting location specific information to the mobile computing device application 102' to be viewed by the customer (Step 9).

The validity of the session ID may be limited to a given time frame. If a timeout occurs, enterprise services 103 will reject requests coming from the mobile computing device application 102'. If the session ID is not expired, the mobile computing device application 102' can capture other 2D barcodes to retrieve location specific services. These requests can directly communicate with enterprise services 103 without going through the authentication service 104, until the session ID expires.

Figure 3A:
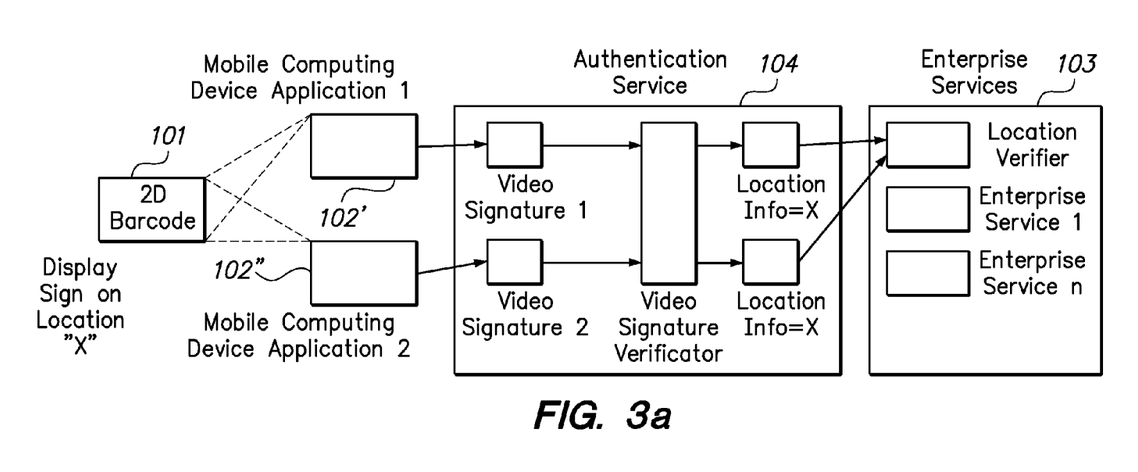
FIG. 3A is a diagram illustrating two mobile computing device applications accessing the same electronic display sign on a same location simultaneously.

FIG. 3A illustrates two mobile computing device applications 102', 102" accessing the same electronic display sign 101 at the same location X simultaneously. The authentication service 104 receives video signature 1 from the first mobile computing device application 102' and applies video signature verification to the video signature. The USDI in the video signature is used to obtain the location information as location X. The location information is sent to enterprise services 103, and in particular to a location verifier. The same process is performed with respect to video signature 2 received from the second mobile computing device application 102".

The function of the location verifier is to ensure that the request is from a valid location. In particular, location information in the form of a reference number is extracted by the authentication service. The authentication service may not know about the details of the location. The location verifier validate the reference number of the location, thereby assuring that the request is from a valid location.

Figure 3B:
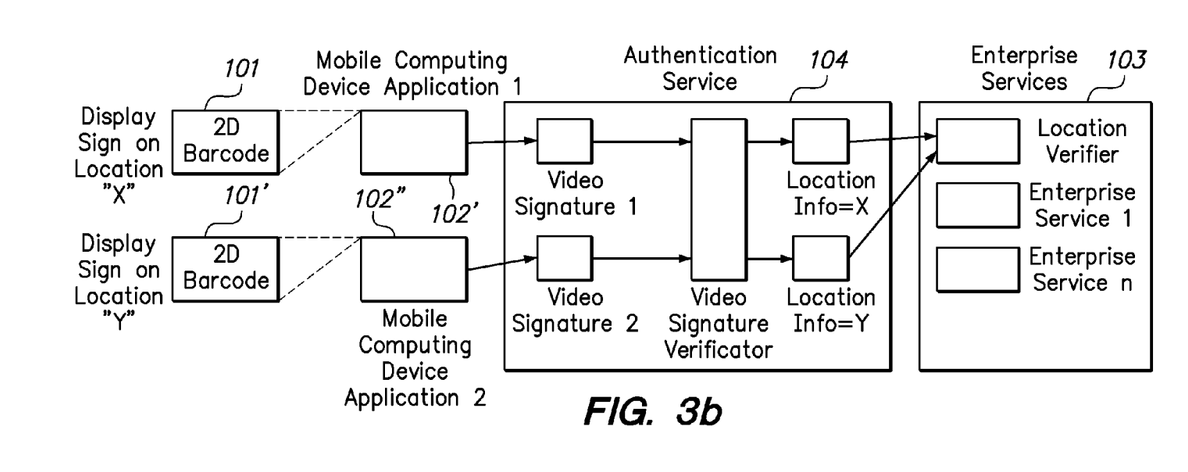
FIG. 3B is a diagram illustrating two mobile computing device applications accessing two different electronic display signs at two different locations simultaneously.

FIG. 3B illustrates two mobile computing device applications accessing two different electronic display signs at two different locations simultaneously.

How Security is Ensured

The foregoing methods are intended to ensure that the customer is physically present in front of the electronic display sign of the enterprise when accessing the available services offered by the enterprise. Other attempts at access need to be prevented. One such attempt may be for the customer to takes video of the electronic display sign using a standard camera and reuse the video to access the enterprise services without being physically present at the enterprise premises.

The mobile computing device application 102' captures a video of the electronic display sign 101 and sends it to the authentication service 104, as previously described. To ensure that the same video stream cannot be reused by another customer who is not present at the enterprise, the authentication service uses a pattern prediction algorithm to verify the authenticity of the video. In one embodiment, the pattern prediction algorithm identifies a pattern using the initial image frames of the video and predicts and verifies the pattern in the successive image frames. Details of one embodiment of the video signature verification algorithm will now be described.

As described previously in relation to FIG. 4, in one embodiment, the electronic display sign displays a frame pattern or video sequence that includes the one-time video signature interspersed with the UDSI. A special field in the 2D barcode denotes whether the frame is a part of the one-time video signature or the frame is the UDSI. This device specific incremental key may be used to generate a unique (i.e., randomized) video signature for the given period. This unique video signature will not be valid during a different time frame. The video signature may be separated into multiple codes. The security strength of the video signature can be increased by increasing parameters such as the number of codes per video signature, capture rate, etc.

The video signature, in one aspect thereof, is a visual effect that is difficult to reproduce or non-reproducible. The customer is prompted to cause an interaction of the customer with the visual effect using the customer's mobile electronic device.

Figure 5A:
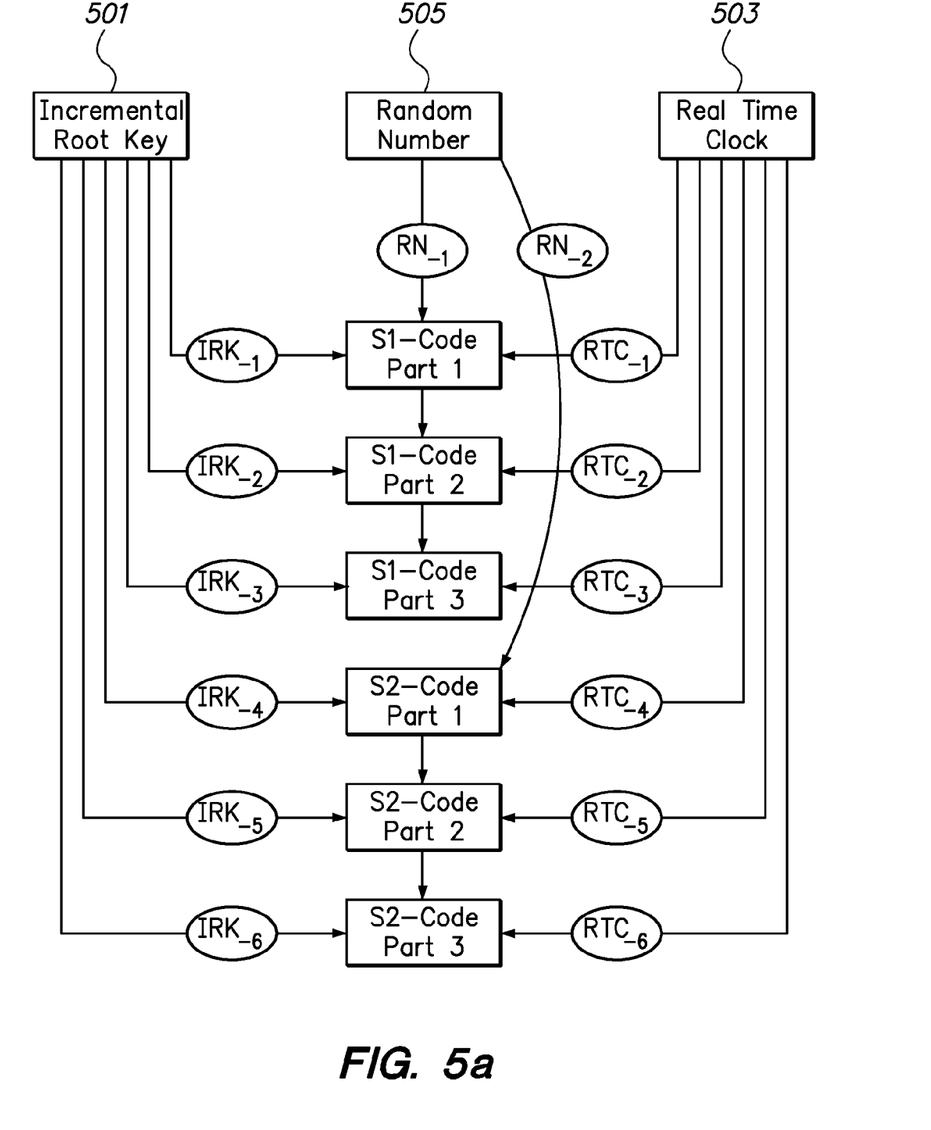
FIG. 5A is a diagram illustrating video signature generation pattern on successive frames displayed on the electronic display sign.

As illustrated in FIG. 5A, a device specific incremental root key (IRK) 501 may be derived using values from a real time clock 503. In one embodiment, the first code (S1-Code Part 1) of the video signature is generated by the electronic sign using a mathematical operation which uses a first incremental root key (IRK-1), a random number, and the real time clock value. A mathematical operation is performed on these elements. The mathematical operation may be, for example, an XOR (Exclusive OR) binary operation. The Root Key can be a static value, or it may be a value that is sequentially increased (making the algorithm more robust). The second code (S1-Code Part 2) is generated based on the Root Key, the real time clock value, and the previously generated code (S1-Code Part 1) as the input, After completing a series of such one-time video signature operations, the algorithm again uses a random number and starts the same process.

Note that since the electronic sign and the enterprise servers) are in network communication, the foregoing steps may, in various embodiments, be accomplished by action of the electronic sign alone or in cooperation with the enterprise server(s).

At the authentication service, the video signature may be verified using a forward prediction algorithm. A given number of consecutive frames of the video signature will be processed to generate the subsequent predicted frame of the video signature. Afterwards, this predicted frame will be verified with the subsequent actual frame. If these are identical, the video signature will be treated as genuine. For instance, for a video signature with a combination of three code parts, using S1-Code Part 1, the algorithm can predict S1-Code Part 2. The backend system has a real time clock synchronized with the electronic sign display unit. The UDSI is mapped to the incremental root key used to generate the signature code parts. Thus, using the S1-Code Part 1, the incremental root key, and the real time clock, the backend system has the ability to generate the S1-Code Part 2. Afterwards, if the predicted S1-Code Part 2 is identical to actual S1-Code Part 2, the verification is treated as a successful verification. The same process repeats until all the parts of the signature is verified.

Figure 5B:
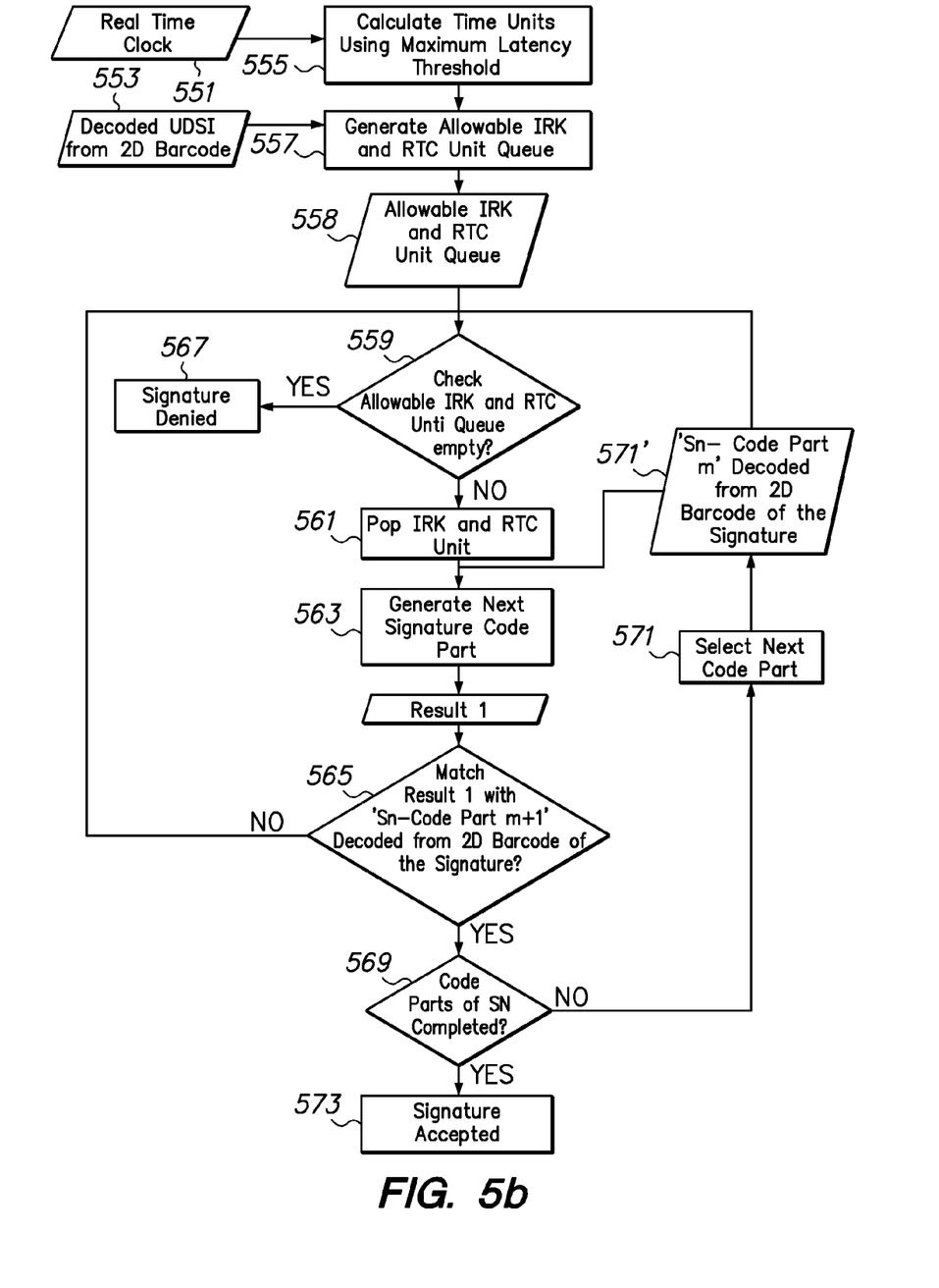
FIG. 5B is a diagram illustrating a video signature verification process.
Figure 5C:
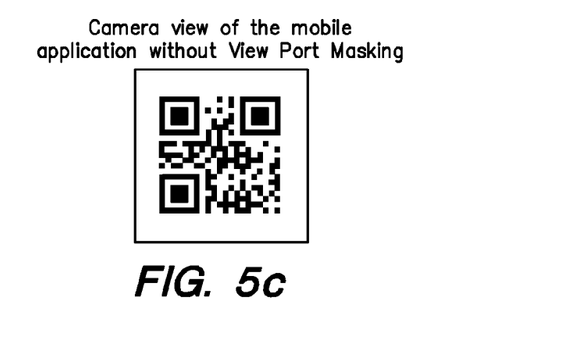
FIG. 5C is a diagram illustrating a camera view of the mobile application without viewport masking.
Figure 5D:
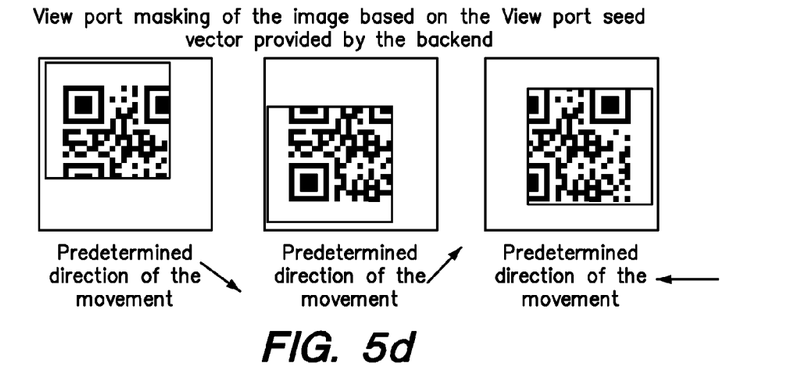
FIG. 5D is a diagram illustrating view port masking of the display of the mobile computing device, inducing movement of the camera.
Figure 5E:
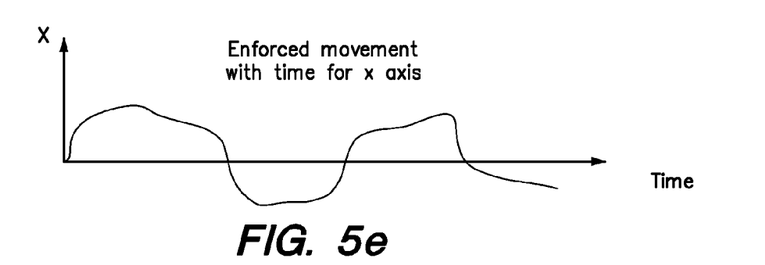
FIG. 5E is a diagram a motion pattern generated based on the induced movement.
Figure 5F:
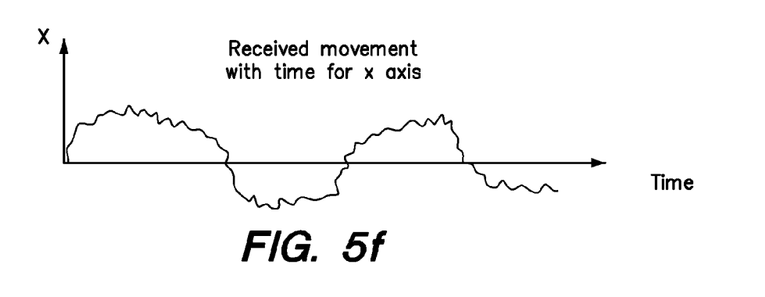
FIG. 5F is a diagram a received motion pattern signal generated based on the induced movement.

Referring more particularly to FIG. 5B, illustrating a verification process in accordance with one embodiment, at the time a video signature is received at the authentication service 104, the real time clock value 551 is recorded, and time units are calculated (Step 555) according to a maximum latency threshold. The UDSI 553 is extracted from the video signature, and the UDSI and the time units are used to generate a queue 558 of allowable RTC time units and incremental root key (IRK) values (Step 557). An example of such a queue is shown as 901IRK and 901RTC in FIG. 9.

Verification proceeds as follows. So long as the IRK/RTC queue is not empty (Step 559), the IRK/RTC queue is popped (Step 561), and the values used to generate the next expected signature code part (Step 563), designated as Result 1. A check is then made to see whether Result 1 matches the next expected signature code part (Step 565).

Figure 9:
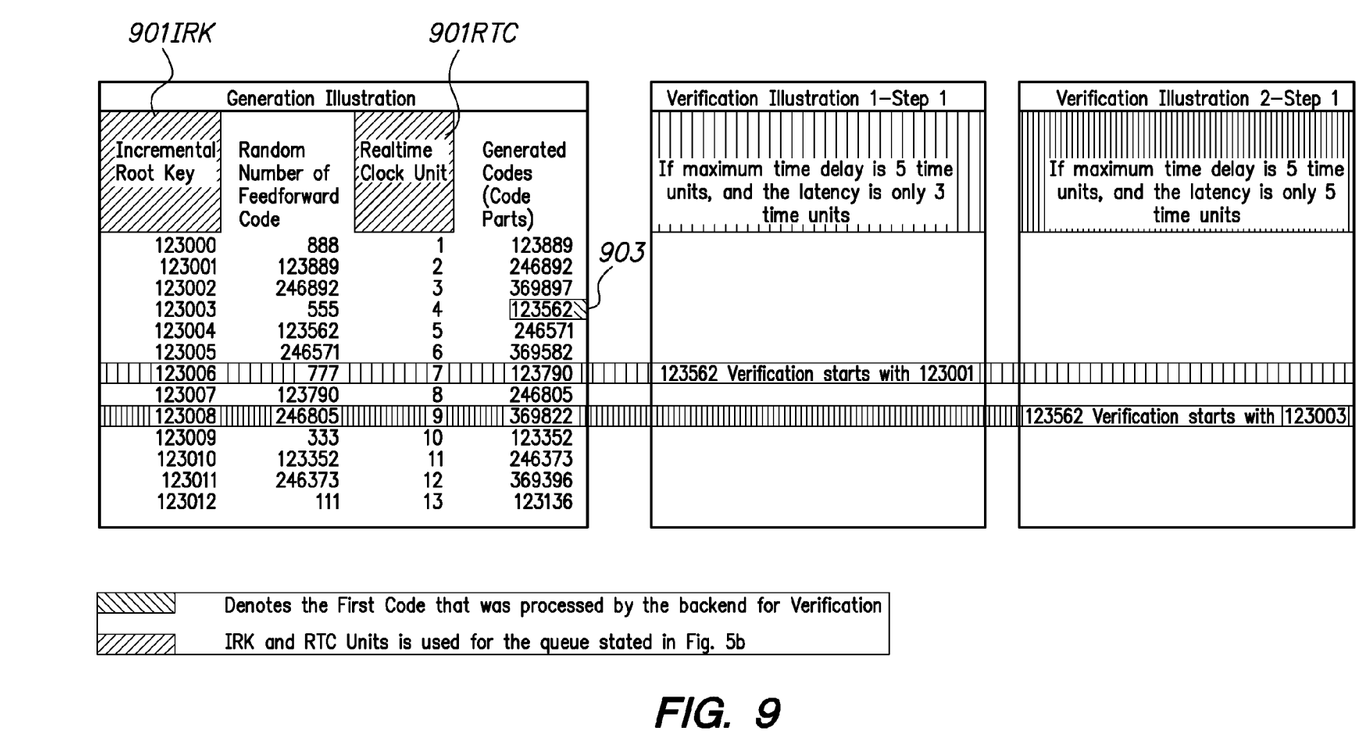
FIG. 9 is a diagram illustrating an example of video signature verification in accordance with the method of FIG. 5B.

Referring to FIG. 9, assume for purposes of illustration (Illustration 1), that the maximum latency threshold is five time units. Assume further that the actual latency experienced is three time units. At time unit 7, the authentication service 104 receives a video signature having a first generated code of 123562 (reference numeral 903). That is, S1-Code Part 1 equals 123562. Since the maximum latency threshold is five time units, the authentication service 104 will count back five time units to time unit 2 and will begin verification of the code 123562 starting with the IRK 123001. Since the actual latency was only three time units (not five), a match will not result in Step 565 of FIG. 5B.

So long as the IRK/RTC queue is not empty (Step 559), the next queue entry will be popped (Step 561) and used to attempt verification. In the present example, the next queue entry corresponds to time unit 3. Again, no match is found. In the next subsequent pass, however, the next queue entry will correspond to time unit 4. In Step 565, a match will be found. Note that if the queue is exhausted before a match is found, then the signature is denied (Step 567).

Typically, multiple successive matches will be required in order for the video signature to be verified. Hence, in Step 569, if the code parts of a signature part Sn are not completed, then the next code part is selected (Step 571), a further result is generated, and a check is made to see whether the generated result matches the expected result. Note that, since the real time clocks at the electronic signs and at the backend authentication service are synchronized, once the value $RTC_{-1}$ has been identified by the authentication service, subsequent values $RTC_{-2}$, etc., are also known by the authentication service.

This manner of operation proceeds until all of the codes parts have been correctly matched, at which point the signature is accepted (Step 573).

Referring again to FIG. 9, assume for purposes of illustration (Illustration 2), that the maximum latency threshold is five time units. Assume further that the actual latency experienced is five time units. At time unit 9, the authentication service 104 receives a video signature having a first generated code of 123562 (reference numeral 903). That is, S1-Code Part 1 equals 123562. Since the maximum latency threshold is five time units, the authentication service 104 will count back five time units to time unit 4 and will begin verification of the code 123562 starting with the IRK 123003. Since the actual latency was in fact five time units, a match will result in Step 565 of FIG. 5B.

While the foregoing verification methods are exemplary, any of various known verification methods may be used, including, for example, methods for generating and verifying one-time passwords and/or sequences of the same.

The foregoing systems and methods provide an easy, secure way to access services using a mobile computing device application. The mobile computing device application becomes a trusted end point to the enterprise so that enterprise services can respond to requests received from the mobile computing device application. These methods and systems can be useful for enterprises for publishing services, including publishing item price details (e.g., for retailers), publishing promotional details for any type of organization, etc.

Other embodiments of the invention may make use of biometric information to enhance security. In one embodiment, a method of verifying presence of a customer includes capturing customer specific biometric information using a mobile computing device, the mobile computing device being provided with a mobile computing device ID; capturing at least one of an enterprise ID and a location ID using the mobile computing device; and the mobile computing device using the biometric information, the mobile computing device ID, and at least one of the enterprise ID and the location ID to generate a signature using an algorithm. The biometric information may be any of various types, including fingerprint information, information derived from a user's eye, etc.

It will be apparent to those of ordinary skill in the art that the present invention can be embodied in other specific forms without departing from the spirit or essential character thereof. The foregoing description is therefore to be regarded as illustrative, not restrictive. The scope of the invention is defined by the appended claims, not the foregoing description, and all changes which some within the range of scope of equivalents thereof are intended to be embraced therein.

What is claimed is:

1. A computer-implemented method of verifying presence of a shopper using a mobile electronic device at a location of an electronic sign display device on a shopping floor, the method comprising:
    displaying a video sequence on at least a portion of the electronic sign display device located on the shopping floor;
    receiving video information from the mobile electronic device, to have been obtained from video capture of the video sequence displayed on the electronic sign display device by the shopper using the mobile electronic device; and
    determining whether the shopper is present at the location on the shopping floor by determining whether the video information matches the video sequence displayed on the electronic sign display device.

2. The method of claim 1, comprising randomizing the video sequence.

3. The method of claim 2, wherein the video sequence includes a video frame having encoded therein an identifier, wherein the identifier identifies the electronic sign display device.

4. The method of claim 2, wherein the identifier is encoded in the form of a graphic pattern.

5. The method of claim 4, wherein the video sequence comprises other graphic patterns.

6. The method of claim 5, wherein the other graphic patterns are using at least one of the following: a root key, and a real time clock value.

7. The method of claim 5, wherein determining whether the video information matches the video sequence displayed on the electronic sign display device comprises:
    processing data of a plurality of video frames to obtain predicted data of a succeeding video frame; and
    comparing actual data of the succeeding video frame with the predicted data.

8. A system for verifying presence of a shopper using a mobile electronic device at a location on a shopping floor, comprising:
    a display device located on the shopping floor for displaying on at least a portion thereof a video sequence; and
    a service for receiving video information from the mobile electronic device, to have been obtained from video capture of the video sequence displayed on the display device;
    wherein said service is configured for determining whether the video information matches the video sequence displayed on the display device.

9. The apparatus of claim 8, wherein the video sequence is randomized.

10. The apparatus of claim 9, wherein the video sequence includes a video frame having encoded therein an identifier, wherein the identifier identifies the display device.

11. The apparatus of claim 9, wherein the identifier is encoded in the form of a graphic pattern.

12. The apparatus of claim 11, wherein the video sequence comprises other graphic patterns.

13. The apparatus of claim 12, wherein the other graphic patterns are using at least one of the following: a root key, and a real time clock value.

14. The apparatus of claim 12, wherein said service is configured for:
   processing data of a plurality of video frames to obtain predicted data of a succeeding video frame; and
   comparing actual data of the succeeding video frame with the predicted data.

* * * * *